(12) United States Patent
Zheng et al.

(10) Patent No.: US 9,838,189 B2
(45) Date of Patent: Dec. 5, 2017

(54) METHOD AND NODE FOR INTERFERENCE MEASUREMENT VIA INTER-CELL COOPERATION

(71) Applicant: ZTE CORPORATION, Shenzhen, Guangdong Province (CN)

(72) Inventors: Yong Zheng, Shenzhen (CN); Yu Ngok Li, Shenzhen (CN); Yunfeng Sun, Shenzhen (CN)

(73) Assignee: XI'AN ZHONGXING NEW SOFTWARE CO., LTD., Xi'An, Shaanxi (CN)

( * ) Notice: Subject to any disclaimer, the term of this patent is extended or adjusted under 35 U.S.C. 154(b) by 60 days.

(21) Appl. No.: 14/894,373

(22) PCT Filed: May 8, 2014

(86) PCT No.: PCT/CN2014/077064
§ 371 (c)(1),
(2) Date: Nov. 27, 2015

(87) PCT Pub. No.: WO2014/190848
PCT Pub. Date: Dec. 4, 2014

(65) Prior Publication Data
US 2016/0112177 A1   Apr. 21, 2016

(30) Foreign Application Priority Data

May 31, 2013 (CN) .......................... 2013 1 0213742

(51) Int. Cl.
*H04W 4/00* (2009.01)
*H04L 5/00* (2006.01)
(Continued)

(52) U.S. Cl.
CPC .......... *H04L 5/0073* (2013.01); *H04L 5/0048* (2013.01); *H04L 5/0051* (2013.01);
(Continued)

(58) Field of Classification Search
CPC ............. H04W 72/0446; H04W 88/08; H04W 72/0453
See application file for complete search history.

(56) References Cited

U.S. PATENT DOCUMENTS 9,369,253 B2 * 6/2016 Pourahmadi
2010/0309864 A1 * 12/2010 Tamaki ................. H04W 52/42
370/329
(Continued)

FOREIGN PATENT DOCUMENTS

CN   101777941 A    7/2010
CN   101931957 A   12/2010
(Continued)

OTHER PUBLICATIONS

61692581 Provisional Specification.*

*Primary Examiner* — Siren Wei
(74) *Attorney, Agent, or Firm* — Ling Wu; Stephen Yang; Ling and Yang Intellectual Property

(57) ABSTRACT

Disclosed are an inter-cell coordinated interference measurement method and node, wherein, the method is applied to each node performing a coordinated interference measurement, and includes: receiving first measurement resource information transmitted by other network nodes via a backhaul link to a present node for coordinated interference measurement; determining second measurement resource information used by the present node for interference measurement according to the first measurement resource information transmitted by the coordinated network nodes, and instructing relevant coordinated network nodes to correspondingly configure a resource in accordance with the second measurement resource information of the present node; wherein the second measurement resource includes an interference measurement resource and/or a (Continued)

channel state information reference signal (CSI-RS); and performing interference measurement on the second measurement resource.

19 Claims, 5 Drawing Sheets

(51) Int. Cl.
H04W 52/24 (2009.01)
H04W 72/04 (2009.01)
H04W 72/08 (2009.01)
H04W 24/10 (2009.01)

(52) U.S. Cl.
CPC ..... *H04W 52/243* (2013.01); *H04W 72/0446* (2013.01); *H04W 72/0453* (2013.01); *H04W 72/082* (2013.01); *H04W 24/10* (2013.01)

(56) References Cited

U.S. PATENT DOCUMENTS

| | | | | |
|---|---|---|---|---|
| 2012/0155291 A1* | 6/2012 | Koivisto | ............... | H04B 7/024 370/252 |
| 2012/0157082 A1* | 6/2012 | Pedersen | ............... | H04W 24/10 455/422.1 |
| 2012/0315859 A1* | 12/2012 | Lee | ............... | H04J 11/005 455/67.13 |
| 2013/0136100 A1 | 5/2013 | Yoon et al. | | |
| 2013/0194950 A1* | 8/2013 | Haghighat | ............ | H04W 24/02 370/252 |
| 2013/0242902 A1* | 9/2013 | Liu | ............... | H04W 24/10 370/329 |
| 2013/0286867 A1* | 10/2013 | Davydov | ............ | H04W 24/06 370/252 |
| 2013/0336214 A1* | 12/2013 | Sayana | ............... | H04B 7/024 370/328 |
| 2014/0092785 A1* | 4/2014 | Song | ............... | H04L 1/00 370/280 |

FOREIGN PATENT DOCUMENTS

| | | |
|---|---|---|
| CN | 102355292 A | 2/2012 |
| CN | 102612089 A | 7/2012 |
| CN | 102754458 A | 10/2012 |
| CN | 102754457 A | 10/2014 |
| WO | WO2013070968 A1 | 5/2013 |

* cited by examiner

METHOD AND NODE FOR INTERFERENCE MEASUREMENT VIA INTER-CELL COOPERATION

TECHNICAL FIELD

The present document relates to the field of communications, and more particularly, to an inter-cell coordinated interference measurement method and node.

BACKGROUND OF THE RELATED ART

In order to increase the data throughput of edge users having relatively large inter-cell interference in the cellular network, the study in the Long Term Evolution (referred to as LTE) system R12 proposed the small cell technology which increases the capacity of wireless networks by adding a lot of low-power base stations. These wireless networks can be densely distributed in a certain area to form a cluster, and cells within one cluster may be connected via a non-ideal backhaul link. Because the distance between the base stations is small, interference between the cells can be relatively severe.

As the scenario shown in FIG. 1, there are three co-frequency adjacent small cells 1, 2 and 3 in the coverage of macro cell. The user equipment 1 (UE1) under the small cell 1 is located at the cell edge close to the small cell 1 and the small cell 2, the UE1 will be subject to interference from the small cell 2 and the small cell 3.

Various inter-cell interference coordination methods can be used to reduce interference. In order to achieve interference coordination, the base stations need to obtain each other's interference information, namely, obtain the adjacent cell interference information by measuring the channel state information (referred to as CSI), wherein, the CSI may comprise the channel measurement of adjacent cells, usually the Non-Zero Power Channel State Information Reference Signal (referred to as NZP-CSI-RS) or interference measurements Resource (IMR) can be used to implement the interference measurement of physical downlink shared channel of adjacent cell.

In the LTE R11 protocol, the UE can measure the interference generated under a certain coordination manner through the interference measurement resources configured by the base station side. The interference measurement is performed through interference measurement resources. As shown in FIGS. 2(a), 2(b) and 2(c), the cell 1 performs the interference measurement on the IMR1, and measures the interference in the case that the cell 3 is shut down, and the cell 3 keeps silent at the Resource Element of the IMR1 in the cell 1 so that the coordinated cell 1 can accurately measure the interference.

In addition, the macro cell and the small cell, as well as the small cell and the small cell are connected via the X2 interface to transmit information to be exchanged between the cells. As described in the 3GPP (The 3rd Generation Partnership Project) LTE small cell technical report TR 36.932, the typical delay of a backhaul link including the X2 interface is 2 ms to 60 ms. In order to reduce or eliminate the inter-cell interference, adjacent small cells also need to perform the interference coordination. Realizing the inter-cell interference coordination needs to exchange interference information with the adjacent cells. A backhaul link such as the X2 interface is needed to perform the information exchange between the cell base stations when performing the interference measurement or exchanging the measurement result.

In the R11 CoMP (Coordinated Multiple Points) transmission, the information exchanging required by such coordinated measurement is connected via an ideal backhaul, in which case the transmission delay of the backhaul link does not need to be considered and content of the protocol interface does not need to be standardized. However, when coordinating between cells connected via the non-ideal backhaul link, it needs to rely on the X2 interface to perform the coordinated information exchange. This requires adding the exchanging information required for the coordinated measurement in the backhaul link relevant interface protocol.

In the non-ideal backhaul link, centralized and decentralized inter-cell coordinated information transmission brings some new problems. In the case that respective base stations are not configured with global measurement resources, it may have the problem of resource configuration conflicts. For example, in a decentralized coordinated information exchanging manner, the coordinated measurement process shown in FIGS. 2(a), 2(b) and 2(c) assumes that the cell 3 and the cell 4 perform coordinated CSI measurement. For the IMR1 used by the cell 1 for performing interference measurement in FIGS. 2(a), 2(b) and 2(c), the cell 3 needs to be coordination silent in the corresponding RE. However, as shown in FIGS. 3 (a) and 3 (b), the cell 4 is measuring the interference of the cell 3 at the same position. Since the cell 4 and the cell 1 are not coordinated cells, a conflict will be generated, and the cell 3 needs to be RE silent at the IMR1 location in order to cooperate the cell 1 to measure, while it cannot be RE silent at the IMR1 location in order to cooperate the cell 4 to perform the interference measurement.

The NZP-CSI-RS measurement can also be used to determine the interference situation between adjacent cells, and it also needs to know the ratio Pc of Physical Downlink Shared Channel (referred to as PDSCH) Energy per Resource Element (referred to as EPRE) to NZP-CSI-RS EPRE when judging the interference situation. These resources also need to be cooperated when being configured between the distributed base stations in the case of non-ideal backhaul link. Moreover, due to the delay problem of non-ideal backhaul link, the Pc transfer needs to more accurately reflect the interference situation of the adjacent cell shared channel at different time points or in different frequency resources. It needs to judge the PDSCH interference situation according to the measurement on the CRS for the transmission modes 1-7 of using Cell-specific Reference Signals (referred to as CRS) to perform the channel state information measurement in the LTE, therefore it needs to exchange the ratio PA of PDSCH EPRE to CRS EPRE between the cells.

In the related interference coordination based on the X2 interface, the load indicator, such as mechanisms of downlink Relative Narrowband TX Power (referred to as RNTP), uplink High Interference Indicator (referred to as HII), or Interference Overload Indicator (referred to as OI), can be used to solve the problem of inter-cell interference information indicator. In the small cell interference avoidance issues studied in the LTE R12, it needs to enhance the downlink interference indicator between the small cells connected via the non-ideal backhaul to meet the complex interference avoidance in this scenario.

In addition, the downlink power control method may also be used as a downlink interference avoidance method, therefore it needs to enhance the ICIC (Inter-Cell Interference Coordination) mechanism in the relevant LTE standard, the possible method can be mechanisms such as introducing the downlink HII or OI. But when using the downlink power control as the interference avoidance method, the uplink or downlink HII and OI simply indicate the interference level information, such as, "high interference", "medium interference" and "low interference", "high interference sensitive", "medium interference sensitive" or "low interference sensitive", and it cannot meet the more accurate downlink power control coordinated information exchanging needs. Through the abovementioned indicator, the adjacent cells cannot obtain quantifiable indicator, such as, what SINR value can be considered as "high interference", therefore it is inconvenient for the adjacent cells to perform the more accurate adjustment of transmitting power. The adjacent cells need more accurate information when performing power control, for example, they need to determine the transmitting power according to the SINR of the UE in the adjacent cells. Moreover, due to different inter-station distance and other factors, the specific values represented by the interference level information may be different in different cells.

SUMMARY OF THE INVENTION

The purpose of the present document is to provide an inter-cell coordinated interference measurement method and node to solve the problem that interference coordinated cells cannot perform an interference measurement accurately when distributed base stations connected via a non-ideal backhaul link perform an interference coordination.

To solve the abovementioned problem, the present document provides an inter-cell coordinated interference measurement method, applied to each node in a coordinated interference measurement, comprising:

receiving first measurement resource information used for a coordinated interference measurement and sent by other network nodes to a present node via a backhaul link;

according to the first measurement resource information sent by coordinated network nodes, determining second measurement resource information used by the present node to perform an interference measurement, and instructing relevant coordinated network nodes to correspondingly perform a resource configuration according to the second measurement resource information of the present node; wherein the second measurement resource comprises: an interference measurement resource and/or a channel state information reference signal (CSI-RS);

performing the interference measurement in the second measurement resource.

Preferably, the first measurement resource information comprises at least:

interference measurement resource information and/or channel information measurement resource; wherein, the interference measurement resource information comprises at least time-frequency location information where the interference measurement resource is located; the channel information measurement resource comprises at least time-frequency locations where non-zero power channel state information reference signals (NZP-CSI-RSs) are located corresponding to the other network nodes, sequence generation IDs and the number of ports.

Preferably, the first measurement resource information further comprises:

ratios Pc of PDSCH EPRE to corresponding NZP-CSI-RS EPRE of the other network nodes, a possible value range of the Pc, or a time-frequency resource indicator associated with the Pc or the possible value range of the Pc.

Preferably, when the first measurement resource information comprises two or more Pcs or possible value ranges of the Pc, and the time-frequency resource indicator associated with each Pc or the possible value range of Pc comprises one bit sequence, and each bit in the bit sequence is used to represent one subframe or one system frame in a time domain, or one resource block (RB) or one sub-band in a frequency domain, and the value of each bit is used to indicate whether a time-frequency resource corresponding to the bit is associated with the Pc or the possible value range of the Pc or not.

Preferably, the Pc or the possible value range of the Pc is the ratio or the possible value range of the ratio of the PDSCH EPRE to the NZP-CSI-RS EPRE in a time period and a frequency range; wherein the time period is a number of consecutive subframes or a subframe set; the frequency range is one physical resource block (PRB), one sub-band, one PRB set, one sub-band set or wideband.

Preferably, the received interference measurement resource information sent by the other network nodes comprises:

configuration information of time-frequency resource of zero power channel state information reference signals (ZP-CSI-RS) of the other network nodes; and/or, configuration information of time-frequency resource that the other network nodes cannot be configured as ZP-CSI-RSs.

Preferably, said instructing the relevant coordinated network nodes to correspondingly perform the resource configuration according to the second measurement resource information of the present node comprises: sending parameters indicating the time-frequency location where the interference measurement resource is located as well as a bit sequence and subframe configuration parameters indicating the ZP-CSI-RS resource location; and/or, sending an indicator of a silent node corresponding to the interference measurement resource.

Preferably, an indicator of a silent node corresponding to the interference measurement resource comprises:

each interference measurement resource corresponding to one bit, the value of bit being used for indicating whether the relevant coordinated node is silent at a corresponding interference measurement resource location or not; or, the interference measurement resource corresponding to one bit sequence, each bit in the bit sequence corresponding to one interference measurement resource, the value of each bit being used for indicating whether the relevant coordinated network node is silent at a corresponding interference measurement resource location or not; or, each interference measurement resource corresponding to a group of cell identifications or list of cell identifications corresponding to the coordinated network nodes, which comprises indicating a list of nodes which should or should not be silent at a resource element location of the interference measurement resource.

Preferably, contents of indicators sent to different network nodes are different.

Preferably, the backhaul link comprises at least: a X2 interface or S1 interface.

Preferably, the method further comprises: after receiving indicators sent by other network nodes instructing the present node to perform a resource configuration in accordance with the interference measurement resource information of the other network nodes, being silent or avoiding to be silent in corresponding resources according to the indicator.

Preferably, the method further comprises: after receiving indicators sent by other network nodes instructing the present node to perform a resource configuration in accordance with the interference measurement resource information of the other network nodes, controlling transmitting powers of the PDSCH and the NZP-CSI-RS in the corresponding time frequency resource according to the Pc or the value range of Pc carried in the interference measurement resource information of the other network nodes as well as the associated time frequency resource indicator.

Preferably, the method further comprises:

after performing the interference measurement in the measurement resource, the node sending interference indicator information coming from adjacent cells in the time frequency resource in the cell where the node is located to other network nodes via a backhaul link;

after receiving the interference indicator information sent by the other network nodes, adjusting a resource scheduling to avoid interference according to the interference indicator information;

wherein the transmitted interference indicator information comprises at least: an interference degree indicator sequence composed of indicators of interference degrees subjected by the present node from the adjacent cells or interference degrees on the adjacent cells in a plurality of particular time-frequency resources within the cell where the node is located; and/or, interference values corresponding to the interference degrees, or an interference value set composed of interference thresholds corresponding to the interference degrees.

Preferably, the particular time-frequency resource comprises: a subframe set, physical resource blocks on a plurality of consecutive subframes, a sub-band or a wideband.

Preferably, interference values in the interference value set comprise: signal to interference plus noise ratio (SINR), interference power, a ratio Pc of physical downlink shared channel (PDSCH) EPRE to corresponding non-zero power channel state information reference signal (NZP-CSI-RS) EPRE, a ratio PA of PDSCH EPRE to cell-specific reference signals (CRS), or a channel quality indicator (CQI) index;

accordingly, the interference threshold comprises: a SINR threshold, interference power threshold, Pc threshold, PA threshold or CQI threshold.

Preferably, elements in the interference degree indicator sequence comprise:

interference values in the interference value set; and/or, an interference degree level indicator; and/or, an interference sensitive degree level indicator; and/or, one bit or bit sequence, used for indicating values in the interference value set.

Preferably, when the first network node determines different interference values or interference thresholds in the interference value set, only some or all of the time-frequency resources associated with the corresponding interference degree or the interference sensitive degree are used as a reference resource.

Accordingly, the present document further provides a node, comprising:

a receiving module, configured to: receive first measurement resource information sent by other network nodes to the present node via a backhaul link for coordinated interference measurement;

a processing module, configured to: determine second measurement resource information used by the present node for performing an interference measurement according to the first measurement resource information sent by coordinated network nodes and received by the receiving module, and instruct relevant coordinated network nodes to perform a resource configuration correspondingly in accordance with the second measurement resource information of the present node; wherein the second measurement resource comprises: an interference measurement resource and/or channel state information reference signal (CSI-RS);

a measuring module, configured to: perform the interference measurement in the second measurement resource determined by the processing module.

Preferably, the first measurement resource information received by the receiving module comprises at least:

interference measurement resource information and/or channel information measurement resource, wherein, the interference measurement resource information comprises at least time-frequency location information where an interference measurement resource is located; the channel information measurement resource comprises at least time-frequency locations where non-zero power channel state information reference signals (NZP-CSI-RS) are located corresponding to the other network nodes, sequence generation IDs and the number of ports.

Preferably, the first measurement resource information received by the receiving module further comprises:

ratios Pc of PDSCH EPRE to corresponding NZP-CSI-RS EPREs of the other network nodes, a possible value range of the Pc or a time-frequency resource indicator associated with the Pc or the possible value range of the Pc.

Preferably, the receiving module is configured to: when the received first measurement resource information comprises two or more Pcs or possible value ranges of the Pc, the time-frequency resource indicator associated with each Pc or possible value range of Pc comprises one bit sequence, and each bit in the bit sequence is used to represent one subframe or one system frame in a time domain, or one resource block (RB) or one sub-band in a frequency domain, and the value of each bit is used to indicate whether time-frequency resources corresponding to the bit are associated with the Pc or the possible value range of the Pc or not.

Preferably, the Pc or the possible value range of the Pc is: the ratio or the possible value range of the ratio of PDSCH EPRE to NZP-CSI-RS EPRE in a time period and a frequency range; wherein the time period is a number of consecutive subframes or a subframe set; the frequency range is one physical resource block (PRB), one sub-band, one PRB set, one sub-band set or wideband.

Preferably, the interference measurement resource information received by the receiving module and sent by the other network nodes comprises: configuration information of time-frequency resource of the zero power channel state information reference signals (ZP-CSI-RS) of the other network nodes; and/or, configuration information of time-frequency resource that the other network nodes cannot be configured as the ZP-CSI-RS.

Preferably, the processing module is configured to: instruct the relevant coordinated network nodes to perform the resource configuration correspondingly according to the second measurement resource information of the present node, comprising:

the processing module sending parameters indicating a time-frequency location where the interference measurement resource is located and a bit sequence and subframe configuration parameters indicating a ZP-CSI-RS resource location; and/or, the processing module sending an indicator of a silent node corresponding to the interference measurement resource.

Preferably, the indicator of silent node corresponding to the interference measurement resource sent by the processing module comprises:

each interference measurement resource corresponding to one bit, the value of bit being used to indicate whether the relevant coordinated nodes are silent at the corresponding interference measurement resource location or not; or, the interference measurement resource corresponding to one bit sequence, each bit in the bit sequence corresponding to one interference measurement resource, and the value of each bit being used for indicating whether the relevant coordinated network nodes are silent at the corresponding interference measurement resource location or not; or, each interference measurement resource corresponding to a group of cell identifications or list of cell identifications corresponding to the coordinated network nodes, which includes indicating a list of nodes which should or should not be silent at resource element locations of the interference measurement resource.

Preferably, the processing module is configured to: send indicators with different contents to different network nodes.

Preferably, the processing module is further configured to: after the receiving module receives an indicator, sent by the other network nodes, instructing the present node to perform a resource configuration in accordance with the interference measurement resource information of the other network nodes, be silent or avoid to be silent in the respective resource according to the indicator.

Preferably, the processing module is further configured to: after the receiving module receives an indicator sent by the other network nodes instructing the present node to perform a resource configuration in accordance with the interference measurement resource information of the other network nodes, and control transmitting powers of the PDSCH and the NZP-CSI-RS in the corresponding time frequency resource according to the associated time frequency resource indicator and the Pc or the value range of Pc carried in the interference measurement resource information of the other network nodes.

Preferably, the measuring module is further configured to: after performing the interference measurement in the measurement resource, send interference indicator information from adjacent cells in the time frequency resource in the cell where the node is located to other network nodes via a backhaul link;

the processing module is further configured to: after the receiving module receives the interference indicator information sent by the other network nodes, adjust a resource scheduling to avoid interference according to the interference indicator information;

wherein the interference indicator information transmitted by the measuring module comprises at least: an interference degree indicator sequence composed of indicators of interference degrees subjected by the present node from adjacent cells or interference degrees on the adjacent cells in a plurality of particular time-frequency resources within a cell where the present node is located; and/or, interference values corresponding to the interference degrees, or an interference value set composed of interference thresholds corresponding to the interference degrees.

Preferably, the particular time-frequency resource comprises: a subframe set, physical resource blocks on a plurality of consecutive subframes, a sub-band or a wideband.

Preferably, interference values in the interference value set comprise: signal to interference plus noise ratio (SINR), interference power, a ratio Pc of physical downlink shared channel (PDSCH) EPRE to corresponding non-zero power channel state information reference signal (NZP-CSI-RS) EPRE, a ratio PA of PDSCH EPRE to cell-specific reference signals (CRS), or a channel quality indicator (CQI) index; accordingly, the interference threshold comprises: a SINR threshold, interference power threshold, Pc threshold, PA threshold or CQI threshold.

Preferably, elements in the interference degree indicator sequence comprises:
interference values in the interference value set; and/or,
an interference degree level indicator; and/or,
an interference sensitive level indicator; and/or,
one bit or a bit sequence, used for indicating values in the interference value set.

Preferably, the processing module is configured to: when determining different interference values or interference thresholds in the interference value set, only take some or all of time-frequency resources associated with the corresponding interference degree or the interference sensitive degree as a reference resource.

With the embodiment of the present invention, the cells can obtain the interference measurement resource configuration used for an accurate interference measurement to avoid conflicts of interference measurement resource configuration between the cells; through the indicators of the expected downlink reference signal to the downlink service EPRE ratio, the cell can obtain the expected interference information of the adjacent cells; by exchanging more accurate quantifiable interference level information, the cells can perform a more accurate resource scheduling to avoid the inter-cell interference.

PREFERRED EMBODIMENTS OF THE INVENTION

Hereinafter in conjunction with the accompanying drawings, embodiments of the present invention will be described in detail. It should be noted that in the case of no conflict, embodiments and features in the embodiments of the present application may be arbitrarily combined with each other.

In the present embodiment, adjacent nodes exchange some parameters required for channel measurement or interference measurement, so that the nodes which need to perform the interference measurement can obtain measurement resources for correctly measuring the adjacent nodes, and it can obtain the coordinated measurement of other related nodes, so as to obtain more accurate interference measurement information. The nodes can also notify the adjacent nodes of the obtained more accurate interference measurement information, so that the adjacent nodes can perform a more accurate power control.

Figure 4:
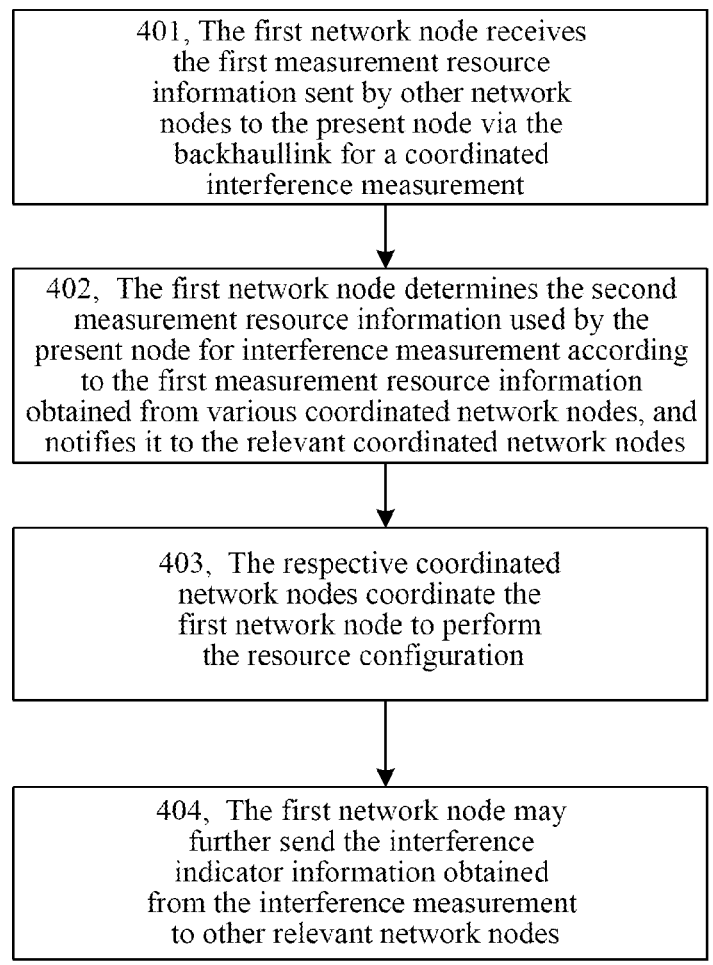
FIG. 4 is a flow chart of an inter-cell coordinated interference measurement method in accordance with an embodiment of the present invention.

As shown in FIG. 4, an inter-cell coordinated interference measurement method, applied to each node in the coordinated interference measurement, comprises:

in step 401: the first network node receives the first measurement resource information sent by other network nodes to the present node via the backhaul link for a coordinated interference measurement;

The specific implementation manner of the step may comprise: after the first network node sends a request to other network nodes, the other network nodes responding to the first network node with the first measurement resource information which can be used by the present node for the coordinated interference measurement; or, the other network nodes send an update to the first network node when the first measurement resource information which can be used by the present node for the coordinated interference measurement is updated;

step 402: the first network node determines the second measurement resource information used by the present node for interference measurement according to the first measurement resource information obtained from various coordinated network nodes, and notifies it to the relevant coordinated network nodes; in the following, the first network node may perform the interference measurement according to the determined second measurement resource information; wherein the coordinated network nodes are network nodes coordinating the first network node to perform the interference measurement; the second measurement resource comprises: interference measurement resources and/or channel state information reference signal (CSI-RS);

step 403: the respective coordinated network nodes coordinate the first network node to perform the resource configuration, including that the nodes, which need to be silent in resources, keep silent at the RE location of the interference measurement resource of the first network node, and the measured nodes cannot be silent at the RE location of the interference measurement resource of the first network node;

step 404: the first network node may further send the interference indicator information obtained from the interference measurement to other relevant network nodes, and the relevant network nodes receiving the interference indicator information may take the received interference indicator information as the reference of the inter-cell interference coordination.

The steps therein may be different for specific coordination methods, for example, performing the NZP-CSI-RS measurement on the adjacent cells may not require the step 402 or 403 therein.

In the following, several application examples will be used to further describe the present document.

Figure 1:
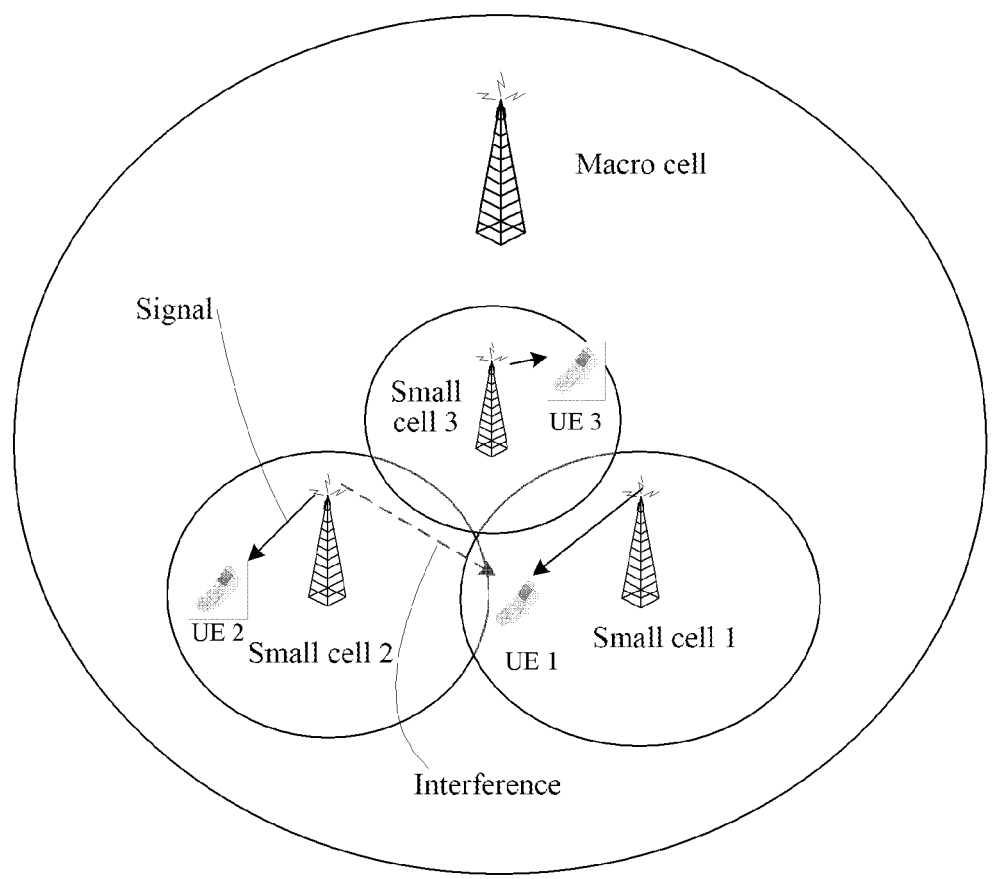
FIG. 1 is a schematic diagram of inter-cell interference measurement and coordination in the related art.
Figure 2A:
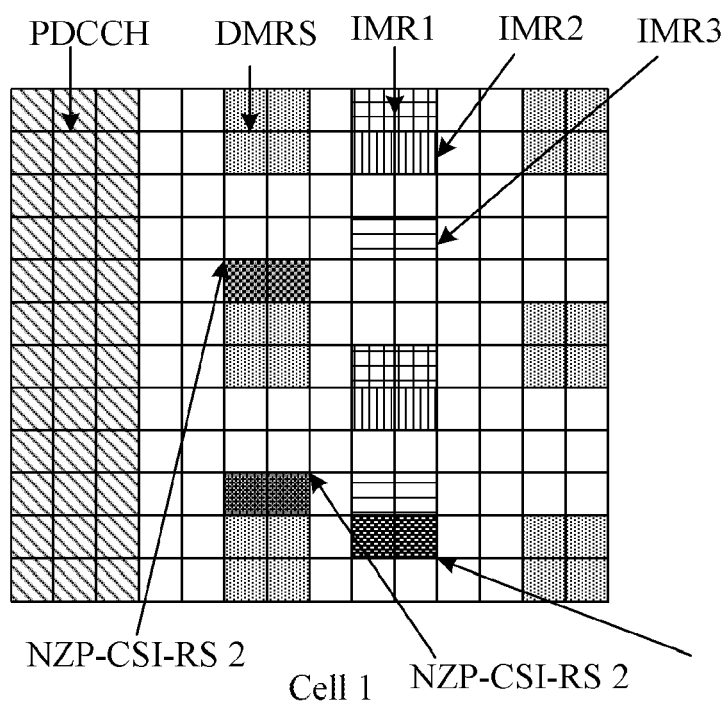
FIGS. 2(a), 2(b) and 2(c) are respective schematic diagrams of coordinated interference measurement between the cells 1, 2 and 3 in the related art.
Figure 2B:
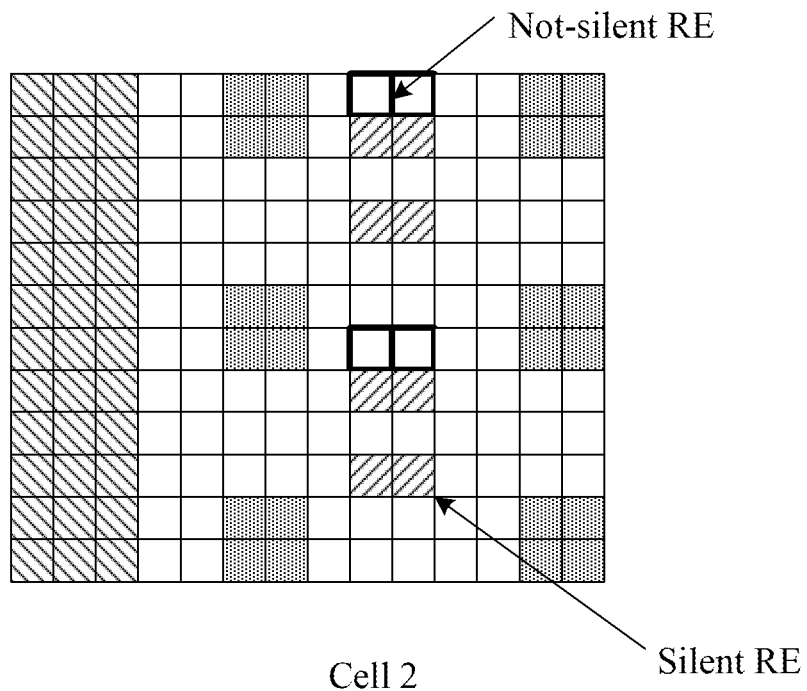
Figure 2C:
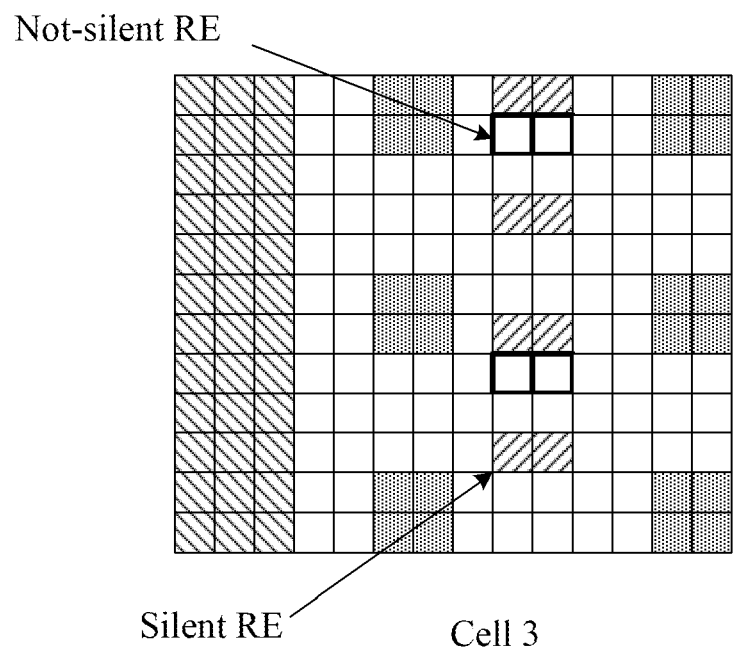
Figure 5:
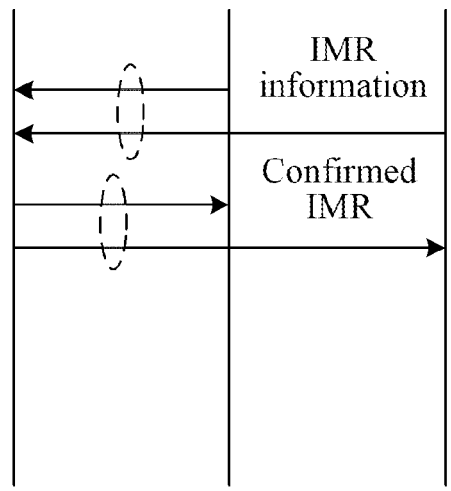
FIG. 5 is a schematic diagram of an IMR configuration process via the X2 interface in a first application example of the present invention.

The First Application Example:

As shown in FIG. 1 and FIGS. 2 (a), 2 (b) and 2 (c), it is assumed that the macro cell and the small cell in FIG. 1 use different carriers, and the small cells 1, 2 and 3 form into one cell cluster, and the base stations to which respective small cells belongs are close to each other and form into one coordinated set. The small cell 1 uses the interference measurement resource to respectively perform interference measurements in the two cases of shutting down the small cell 2 and shutting down the small cell 3. As shown in FIG. 5, the small cell 1 respectively takes the corresponding interference measurement resource information (IMR information) from the small cell 2 and the small cell 3, and perform the interference measurement on the Confirmed interference measurements resource (confirmed IMR). Both the small cell 3 and the small cell 2 has one list of coordinated cells, and this list may be obtained via the inter-base-station measurement, or by using the UE to perform the RSRP (Reference Signal Receiving Power) or SINR (Signal to Interference plus Noise Ratio) measurements on the access cell and the adjacent cells to determine the list and exchanging the measurement result information with the adjacent cells, or through the pre-configuration manner during the cell planning.

Figure 3A:
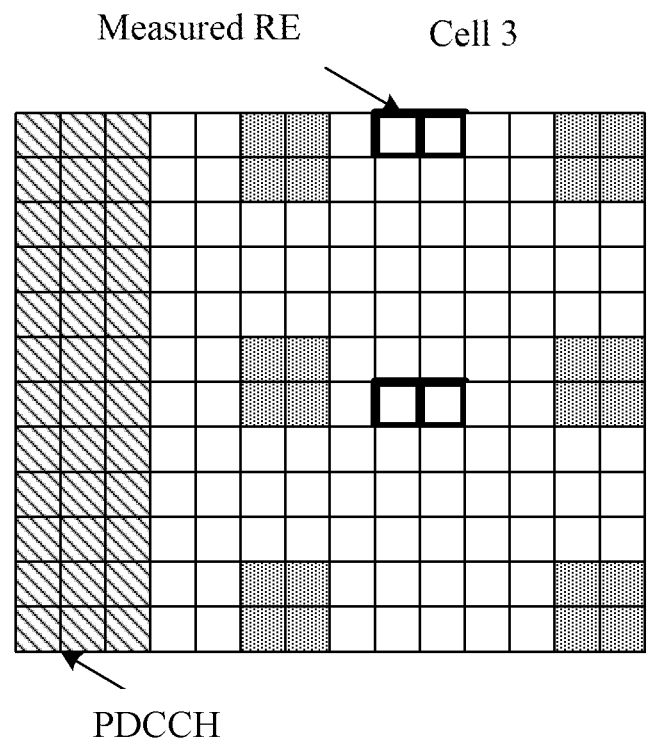
FIGS. 3(a) and 3(b) are respective schematic diagrams of the cell 3 coordinates with the cell 4 in interference measurement while it conflicts with the cell 1 in the interference measurement in the related art.
Figure 3B:
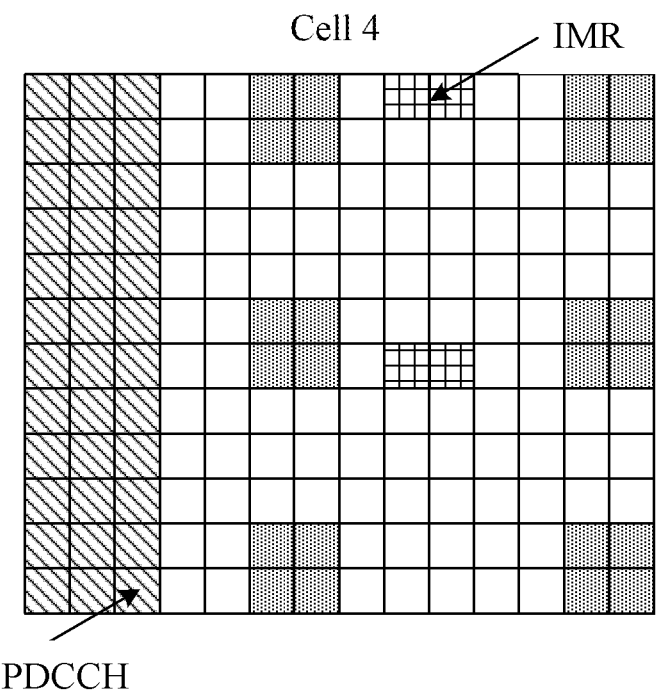

Once the small cells 2 and 3 have the measurement resource updated, for example, the interference measurement resource being in use is configured as the ZP-CSI-RS resource and can be notified via a backhaul link to the small cell 1. For example, the base station to which the small cell 3 belongs notifies the base station to which the small cell 1 belongs of a group of RE locations that cannot be silent, and these locations is possibly being used by the UE in the small cell 4 or the base station to which the small cell 4 belongs for measuring the interference including the small cell 3, such as the case shown in FIGS. 3 (a) and 3 (b).

The measurement resource notification method can be: at least one group of ZP-CSI-RS configurations (specifically refer to section 6.10.5.2 in the LTE protocol 36.211), each group of configurations may comprise: ZP-CSI-RS subframe configuration, such as what is shown in Table 6.10.5.3-1 or 6.10.5.3-2 in the LTE protocol 36.211; as well as one sequence with the length of 16 bits used for indicating the resource position of the ZP-CSI-RS in one physical resource block, and each bit in that sequence is used to indicate one 4-port CSI-RS location composed of four REs, such as the resource location corresponding to the four antenna ports shown in the tables 6.10.5.2-1 in the protocol 36.211.

In the present example, the node 3 (the base station to which the small cell 3 belongs or the UE in the small cell 3) may inform the node 1 (the base station to which the small cell 1 belongs or the UE in the small cell 1) of two groups of ZP-CSI-RS configurations (wherein, the ZP-CSI-RS configuration comprises the interference measurement resources and other ZP-CSI-RS, and the parameter configuration of the interference measurement resource is identical to the configuration parameter of ZP-CSI-RS), wherein one group is the time-frequency resource configuration in which the node 3 has been configured as the ZP-CSI-RS, and the other group is the time-frequency resource configuration in which the node 3 cannot be configured as the ZP-CSI-RS, such as time-frequency resources being used by the UEs or base stations of other cells for the interference measurement. The node 2 (the base station to which the small cell 2 or the UE in the small cell 2) uses the same manner to notify the node 1 of the resource usage situation. In addition, the nodes 2 and 3 also need to inform the node 1 of their respective NZP-CSI-RS configurations that comprise the number of ports, the resource location (table 6.10.5.3-1 or 6.10.5.3-2 in the 36.211) and the subframe configuration (section 6.10.5.2 in the LTE protocol 36.211) of the NZP-CSI-RS.

after receiving the abovementioned resource usage situations sent by the nodes 2 and 3, the node 1 can determine what resources are currently available, and determine a group of interference measurement resource configurations in the available resources and notify it to the nodes 2 and 3. After the node 2 receives the interference measurement resource configurations sent by the node 1, it cannot be configured as the ZP-CSI-RS at the time-frequency location where the interference measurement resource is located. After the node 3 receives the interference measurement resources configuration (as above), it may keep silent at the RE location corresponding to the ZP-CSI-RS. After the configuration, the interference measurement can be carried out.

After the small cell 1 determines the interference measurement resource, it can configure 3 CSI processes when configuring the CSI process for the UE1 within the serving range (of course, in a specific implementation, the number of configured CSI processes can be any positive integer). Each process corresponds to one ZP-CSI-RS measurement and one NZP-CSI-RS measurement. As shown in FIGS. 2 (a), 2 (b) and 2 (c), the NZP-CSI-RS 1 is used for measuring the receiving power P1 of the channel from the small cell 1 to the UE1, and the interference measurement resources IMR1, IMR2 and IMR3 are respectively used to measure the subjected interference power $I_1=I_{out}+P_2$ after shutting down the small cell 3, the subjected interference power $I_2=I_{out}+P_3$ after shutting down the small cell 2, as well as the interference power $I_3=I_{out}$ outside the coordinated set when shutting down the small cells 2 and 3 at the same time, and it can separately obtain $CQI_1=P_1/I_1$, $CQI_2=P_1/I_2$ and $CQI_3=P_1/I_3$. The base station to which the small cell 1 belongs can respectively send these CQIs (Channel Quality Indicators) to the base stations to which the small cell 2 and the small cell 3 belong via a backhaul link for the reference of the interference coordination.

The Second Application Example:

Different from the first application example, before the base station to which the small cell 1 belongs needs to obtain contents of the small cell 2 and small cell 3, including the interference measurement resource being in use, resources configured as the ZP-CSI-RS, or the RE locations at which they are being measured by the other nodes, it respectively sends a request to the small cell 2 and the small cell 3, and then the small cell 2 and the small cell 3 send the small cell 1 contents including the respective interference measurement resources being in use, resources configured as the ZP-CSI-RS or RE locations at which they are being measured by the other nodes and so on. The other procedures are the same as the above-mentioned first application example and will not be repeated here.

Figure 6:
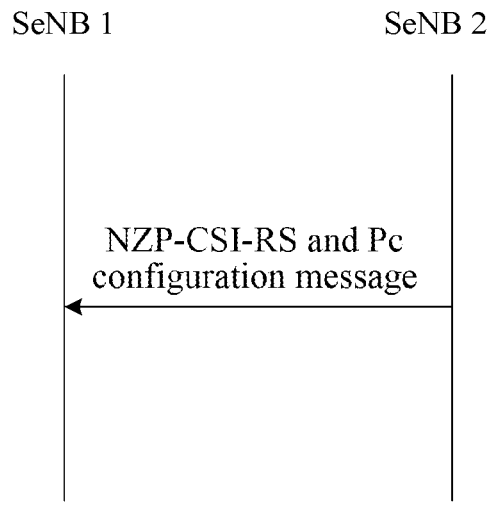
FIG. 6 is a schematic diagram of notifying to use the CSI-RS configuration in adjacent cell channel measurement via the X2 interface in a third application example of the present invention.

The Third Application Example:

Different from the first and second application examples, in the present application example, base station to which the small cell 1 belongs or the UE within its serving range obtains the interference measurement resource information by measuring the NZP-CSI-RS of the adjacent cells. The small cells 2 and 3 respectively notify the small cell 1 of the configuration information of NZP-CSI-RS 2 and NZP-CSI-RS 3 (as shown in FIG. 2 (a), 2 (b), 2 (c)) as well as their corresponding ratios $Pc_2$ and $Pc_3$ of PDSCH EPRE to NZP-CSI-RS power (take the small cell 2 as an example, the specific manner is shown in FIG. 6). Wherein, Pc2 and Pc3 are expected power ratios used by the cells 2 and 3. The frequency domain range indicated by each Pc is the corresponding bandwidth of the UE performing the CSI feedback of wideband.

Take the manner of the UE1 measuring and reporting the interference measurement resource information for example, the UE1 obtains the receiving powers P1, P2, P3 from the small cells 1, 2 and 3 by respectively measuring the NZP-CSI-RS 1, the NZP-CSI-RS 2, and the NZP-CSI-RS 3. Herein, the receiving power calculation manner can be $P1=\|H_1\|^2$, $P2=\|H_2\|^2$, and $P3=\|H_3\|^2$. Wherein: $H_1$ is the channel coefficient matrix obtained by the UE1 measuring the NZP-CSI-RS 1, $H_2$ is the channel coefficient matrix obtained by the UE1 measuring the NZP-CSI-RS 2, and $H_3$ is the channel coefficient matrix obtained by the UE1 measuring the NZP-CSI-RS 3; $\|\cdot\|$ represents norm.

Furthermore, the UE1 measures the IMR 3 to obtain the interference power $I_0$ outside the coordinated set. The UE can separately calculate the shared channel interferences from the small cell 2 and the small cell 3: $I_2=P_2\times P_{c2}$ and $I_3=P_3\times P_{c3}$. Furthermore, it calculates to obtain $CQI_1=P1/(I_0+I_2+I_3)$, $CQI_2=P1/(I_0+I_2)$, and $CQI_3=P1/(I_0+I_3)$ and reports them to the base station to which the small cell 1 belongs. The base station to which the small cell 1 belongs may further send the CQI1, the CQI2 and the CQI3 to the base stations to which the small cell 2 and the small cell 3 to be used as the reference of the interference coordination.

The Fourth Application Example:

Different from the third application example, the Pc in the present application example is the upper limit of the ratio of PDSCH EPRE to NZP-CSI-RS EPRE, indicating that the ratio of PDSCH EPRE to NZP-CSI-RS EPRE of a cell does not exceed the Pc, the indicated frequency domain range is the bandwidth of the cell sending the Pc value. Wherein, the value range of the Pc is [−8 15] dB, and its step length is 1 dB.

When the small cell 1 configures the UE1 within its serving range with the CSI feedback, multiple CSI processes can be configured, and each CSI process has its own corresponding NPZ-CSI-RS, interference measurement resources and Pc. Depending on the configuration, the UE1 measures and calculates the corresponding CQI. For example, one process therein can be, as shown in FIG. 2 (a), 2 (b), 2 (c), measuring the channel $H_2$ from the small cell 2 in the NZP-CSI-RS 2 and measuring the interference power $I_{out}$ from outside of the coordinated set (including the small cells 1, 2, 3) on the IMR 3, the $Pc_2$ is −3 dB, representing that the maximum ratio of PDSCH EPRE to NZP-CSI-RS 2 EPRE of the small cell 2 is no more than −3 dB. That is, the maximum interference subjected by the UE1 from the PDSCH of the small cell 2 is no more than $0.5\|H_2\|^2$ on the wideband. When calculating the CQI, the wideband $CQI_{2wB}=0.5\|H_2\|^2/I_{out}$, wherein −3 dB is equivalent to the ratio multiplied by 0.5. In addition, measuring the NZP-CSI-RS1 can obtain the channel $H_1$ of the serving small cell 1 of the UE1, $CQI_{1WB}=\|H_1\|^2/I_{out}$, so that it can calculate that the minimum value of the SINR of the UE1 obtained by the small cell 1 base station is $SINR_1=\|H_1\|^2/(I_{out}+0.5\|H_2\|^2)$ when the small cell 3 is silent while the small cell 2 interferes.

Figure 7A:
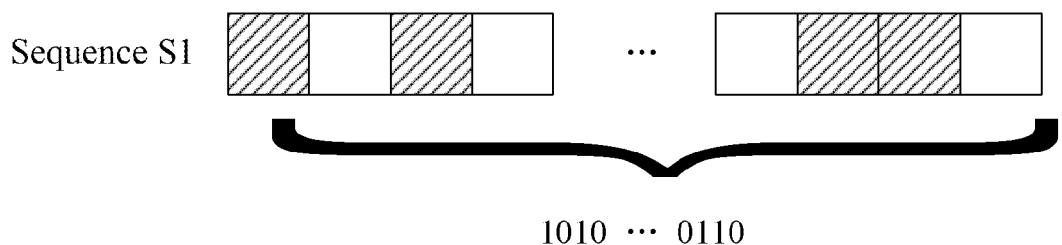
FIG. 7 (a) and FIG. 7 (b) are respective schematic diagrams of using sequences S1 and S2 to indicate the Pc valid range in the frequency domain in a fifth application example.
Figure 7B:
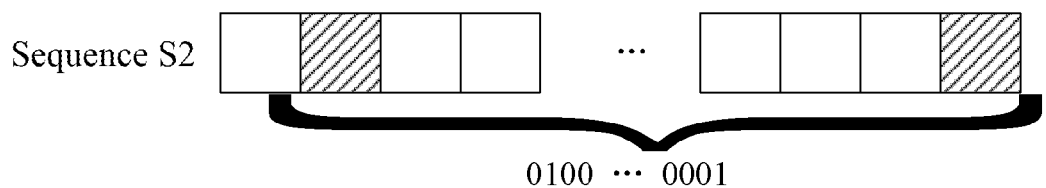

The Fifth Application Example:

Different from the fourth application examples, in this application example, the small cell 2 notifies the small cell 1 of two Pcs, respectively, Pc1=−3 dB, corresponding to 0.5 times of the linear value, Pc2=0 dB, corresponding to 1 times of the linear value. In addition, it also comprises one bit sequence S1 associated with the Pc1 and a bit sequence S2 associated with the Pc2; wherein, the lengths of S1 and S2 are respectively 50, representing that the total bandwidth of the small cell 2 comprises 50 RBs, and the location of each bit in the sequence corresponds to the location of the corresponding RB in the entire bandwidth, as shown in FIG. 7 (a) and FIG. 7 (b). The Pc of the RB corresponding to the bit "1" in the sequence S1 is −3 dB, while the Pc of the RB corresponding to the bit "1" in the S2 is 0 dB. In addition, the channels $H_{2a}$, $H_{2b}$ of the small cell 2 are measured on the NZP-CSI-RS, wherein the $H_{2a}$ represents the channel coefficient matrix measured on the RB indicated by the sequence S1, while the $H_{2b}$ represents the channel coefficient matrix measured on the RB indicated by the sequence S2. Using the above information, it can be obtained that, the minimum SINR subjected by the UE1 from the small cell 2 on the RB indicated by the sequences S1 and S2 is $SINR_{1a}=\|H_1\|^2/(I_{out}+0.5\|H_2\|^2)$ and $SINR_{1b}=\|H_1\|^2/(I_{out}+\|H_2\|^2)$.

The valid interval of the notified Pc in the time domain is from the time point at which the base stations to which the small cell 1 belongs receives the Pc notified by the small cell 2 to the time point at which the Pc notified by the small cell 2 is received at the next time.

The Sixth Application Example:

Different from the fifth application example, in the present application example, the Pc1=−3 dB and Pc2=0 dB notified by the small cell 2 respectively correspond to "0" and "1" in the bit sequence whose length is 50, representing that in the 50 RBs, on the RB corresponding to the bit "1", the ratio of the PDSCH EPRE to the EPRE measured on the NZP-CSI-RS 2 is −3 dB, while on the RB corresponding to the bit "0", the ratio of the PDSCH EPRE to the EPRE measured on the NZP-CSI-RS 2 is 0 dB.

The Seventh Application Example:

Different from the fifth or sixth application example, in the present application example, the bit sequence corresponding to the Pc1 and Pc2 and notified by the small cell 2 is used to indicate the ABS subframes in the ABS (Almost Blank Subframe) subframe configuration cycle whose length is 40 in the FDD (Frequency Division Duplexing) system, wherein each bit in the sequence corresponds to one subframe in the configuration cycle, and "1" indicates the ABS subframes in the 40 subframes, and "0" indicates the non-ABS subframes.

The Eighth Application Example:

Different from the above application examples, in this application example, the small cell 2 notifies the small cell 1 of the interference measurement resource information for interference measurement, and the small cell 1 receiving this information considers keeping silent in the RE of the received interference measurement resource, and measures the interference including the small cell 2.

Figure 8:
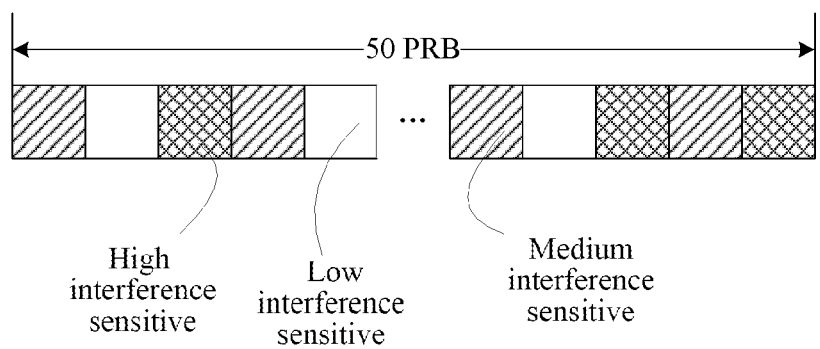
FIG. 8 is a schematic diagram of indicating the interference sensitive degree subjected by the PRB in a ninth application example of the present invention.

The Ninth Application Example:

In this application example, after measuring to obtain the interference result of the small cell 2 according to the method in the respective abovementioned examples, the small cell 1 notifies the small cell 2 of the interference result information via the X2 interface. The notification manner is as follows:

as shown in FIG. 8, it needs to respectively indicate elements {−5 dB, 0 dB, 3 dB} in another notified interference value set by sending one interference degree indicator sequence with the length of 50 bits whose contents are "00", "01", "10", or indicator information indicating "high interference sensitive", "medium interference sensitive" and "low interference sensitive", wherein the value of dB is taken from the value of the RNTP threshold specified in the LTE protocol 36.213, namely {−∞, −11, −10, −9, −8, −7, −6, −5, −4, −3, −2, −1, 0, 1, 2, 3} (dB). It indicates that the small cell 1 suggests the small cell 2 to control the transmitting power lower than the given interference power threshold in the corresponding PRB.

The small cell 2 considers avoiding interference on the small cell 1 during the scheduling after receiving the information. For example, a downlink high interference indicator (DL HII) IE entry is added in the X2 interface protocol. The IE entry is shown in Table 1.

TABLE 1

Description of downlink high interference indicator IE entry

| IE entry name | Appearance in IE | Range | IE Type and Reference Value | Description |
|---|---|---|---|---|
| Downlink HII | | 1 ... <the maximum number of PRB> | | |
| >HII | must | | enum (high interference sensitive, medium interference sensitive, low interference sensitive, ...) | Each PRB corresponds to a location in the list: the first element location in the list corresponds to PRB 0, the second one corresponds to PRB 1, etc ... "High interference sensitive" indicates that the RNTP of the IE recipient should not be higher than the threshold 1, "medium interference sensitive" indicates that the RNTP of the IE recipient should not be higher than the threshold 2, "low interference sensitive" indicates that the RNTP of the IE recipient should not be higher than threshold 3 |
| HII threshold | Must | enum (−∞, −11, −10, −9, −8, −7, −6, −5, −4, −3, −2, −1, 0, 1, 2, 3, ...) | enum (threshold 1, threshold 2, threshold 3) | HII can use the threshold defined in the LTE protocol 36.213, the value of the RNTP threshold indicates the transmitting power threshold of the interfering cell |

The power level is divided into three levels in this application example, and in specific implementations, it can also be divided into any other number of levels. In addition, this application example takes the PRB as the unit of the time-frequency resource corresponding to each element in the interference degree indicator sequence, that is, what is indicated are some PRBs in a number of consecutive subframes, and in the specific implementation, it can also use the sub-band or can be some PRBs or sub-band or wideband in a certain subframe set, such as an ABS subframe set or a non-ABS subframe set in one ABS configuration cycle.

The Tenth Application Example:

Different from the ninth application example in which the small cell 1 requests in advance the small cell 2 to limit the transmitting power less than a given threshold to achieve the interference avoidance, in this application example, the small cell 1 measures the average interference subjected from the small cell 2 in the past several subframes, and calculates the SINR. The small cell 1 quantizes and notifies the SINR to the small cell 2.

Wherein, the interference measurement method of the small cell 1 is as above description, and can be measured via the interference measurement resource or the NZP-CSI-RS. For example, the UE1 uses the NZP-CSI-RS 2 in FIG. 2 (*a*), 2 (*b*), 2 (*c*) to measure the interference channel H2 from the small cell 2, and can calculate $SINR=\|H1W\|^2/\|H_2\|^2$, or $SINR=\|H1W\|^2/(I_{out}+\|H_2\|^2)$, wherein, H1 is the channel coefficient matrix from the cell 1, and W is the precoding matrix. The calculated SINR is converted into the CQI value in the 4 bit CQI table in the LTE protocol 36.213 and is reported to the base stations to which the small cell 1 belongs. The 4-bit CQI table is shown in Table 2.

TABLE 2

| 4-bit CQI table | | | |
|---|---|---|---|
| CQI index | Modulation mode | Code rate × 1024 | Efficiency |
| 0 | out of range | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

The base station to which the small cell 1 belongs sets the corresponding element in the interference degree indicator sequence corresponding to the PRB to be used by the UE1 as one value indicating the corresponding interference degree, such as "high interference", "medium interference" and "low interference", or "00", "01", "10". The base station to which the small cell 1 belongs then notifies the base station to which the small cell 2 belongs of one interference value set {CQIa, CQIb, CQIc}, respectively corresponding to the abovementioned interference degree indicator values, wherein the elements in the interference value set respectively correspond to the CQI values {5,10,15} in the 4 bit CQI table. These values can be converted by the recipient into SINR ratio by looking up the table. Wherein, the mode of adding a downlink interference overload indicator (DL OI) IE entry in the X2 interface protocol can be used to indicate the interference degree, as shown in Table 3.

TABLE 3

| Description of downlink interference overload indicator IE entry | | | | |
|---|---|---|---|---|
| IE entry name | Appearance in IE | Range | IE Type and Reference Value | Description |
| Downlink OI | | 1 . . . <the maximum number of PRBs> | | |
| >OI | Must | | Enum (high interference, medium interference, low interference, . . .) | Each PRB corresponds to one location in the list: the first element location in the list PRB 0, the second one corresponds to PRB 1, and so on . . . "High interference" indicates that the CQI in the interfered resource equals CQI1, "medium interference" indicates that the CQI in the interfered resource equals CQI2, "low interference" indicates that the CQI in the interfered resource equals CQI3 |
| >SINR | Must | Enumerated CQI index (1 . . . 15) | Enum (CQI1, CQI2, CQI3) | CQI1 to CQI 3 may be taken from the 4-bit CQI table in the LTE protocol 36.213 |

In a specific implementation process, the small cell 1 performs an interference measurement on all PRBs labeled as "high interference" and averages the measured values to obtain CQI1, performs an interference measurement on all PRBs labeled as "medium interference" and averages the measured values to obtain CQI2, and performs an interference measurement on all PRBs labeled as "low interference" and averages the measured values to obtain CQI3.

After the small cell 2 receives the interference degree indicator sent by the small cell 1, it can control the transmitting power in the corresponding time-frequency resource through the following formula:

$$P\_tx2 = \max(\min(\alpha \cdot SINR_1 + \beta, P\_max), P\_min)[dBm],$$

wherein, P_tx2 is the transmitting power of the small cell 2 on the PRB corresponding to a certain interference degree, $SINR_1$ is the value of CQI corresponding to the interference degree corresponding to the corresponding PRB notified by the small cell 1 to the small cell 2, P_max and P_min are respectively the maximum and minimum transmitting powers of the small cell 2, and $\alpha$ and $\beta$ are two parameters determined by the small cell 2 according to its scheduling policy.

The Eleventh Application Example:

Different from the ninth and tenth application examples, in this example, the elements in the interference value set transmitted by the small cell 1 to the small cell 2 use the ratio Pc of PDSCH EPRE to NZP-CSI-RS EPRE to characterize the interference or interference threshold. For example, through the power coordination, the respective NZP-CSI-RS powers transmitted by the small cell 1 and the small cell 2 change very slow or are constant relative to the transmitting power adjustment of the PDSCH. The interference can be avoided by adjusting the PDSCH power. In this case, the base station to which the small cell 1 belongs can set {−3 dB, 0 dB, 5 dB} in the interference value set sent to the base station to which the small cell 2 belongs, indicating that the small cell 1 expects that the ratio of the EPRE of PDSCH transmitting power to the EPRE of corresponding NZP-CSI-RS of the small cell 2 in the corresponding time frequency resource is not more than the indicated value of dB, wherein, the value of Pc is in the value range given in the LTE protocol 36.213, namely [8, 15] dB, and selected out from the set which takes 1 dB as the step length.

After receiving the interference indicator sent by the small cell 1, the small cell 2 can adjust the PDSCH transmitting power in the time-frequency resource to make the ratio of it to the EPRE of the NZP-CSI-RS no higher than the desired value of Pc in the interference indicator. Wherein, the downlink high interference indicator (DL HII) IE entry can be added in the X2 interface protocol to indicate the interference threshold, as shown in Table 4.

TABLE 4

Description of downlink high interference indicator IE entry

| IE entry name | Appearance in IE | Range | IE Type and Reference Value | Description |
|---|---|---|---|---|
| Downlink HII | | . . . <the maximum number of PRBs> | | |
| >HII | must | | Enumeration (high interference sensitive, medium interference sensitive, low interference sensitive, . . .) | Each PRB corresponds to one location in the list: the first element location in the list PRB 0, the second one corresponds to PRB 1 , etc "High interference sensitive" indicates that the Pc of the IE receiving node does not exceed Pc1, "medium interference sensitive" indicates that the pc of the IE receiving node does not exceed Pc2, "low interference sensitive" indicates that the Pc of the IE receiving node does not exceed Pc3 |
| Pc threshold | Must | Enumeration [−8, 15] dB, 1 dB step | Enumeration (Pc1, Pc2, Pc3) | Pc1, Pc2, Pc3 are values in the given Pc value range in the LTE protocol 36.213 |

Furthermore, the PA can replace the Pc in the present embodiment. The PA represents the ratio of the EPRE of OFDM symbols without CRS to the CRS EPRE.

The Twelfth Application Example:

In the present example, the small cell 1 notifies the small cell 2 of a group of interference degree indicators and interference values, indicating the interference coordination request in the ABS and non-ABS subframe sets. In particular, it can be achieved by adding the ABS high interference indicator IE entry in the X2 interface protocol, as shown in Table 5 below.

TABLE 5

Description of ABS high interference indicator IE entry

| IE entry name | Appearance in IE | Range | IE Type and Reference Value | Description |
|---|---|---|---|---|
| ABS HII | | one ABS configuration cycle | | |

TABLE 5-continued

Description of ABS high interference indicator IE entry

| IE entry name | Appearance in IE | Range | IE Type and Reference Value | Description |
|---|---|---|---|---|
| >FDD | | 40 subframes | | |
| >>HII | must | | A bit sequence with a length of 40 | Each location in the bit sequence corresponds to one downlink subframe, wherein "1" indicates that the Pc of the subframe of the IE recipient should not be higher than Pc1, and "0" indicates that the pc of the subframe of the IE recipient should not be higher than Pc2. The first location of the bit sequence corresponds to the subframe 0 whose radio frame number is SFN = 0. The HII configuration pattern of the downlink subframes is cyclically repeated by taking 40 subframes as the cycle |
| Pc threshold | Must | Enumeration [−8, 15] dB, 1 dB step | Enumeration (Pc1, Pc2) | Pc1, Pc2 are taken from the given Pc value range in the LTE protocol 36.213 |

After receiving the IE entry, the receiving node considers adjusting the transmitting power of PDSCH in various subframe sets according to the Pc threshold indicator to achieve the interference coordination. For a TDD system, it may use a similar indicator.

The Thirteenth Application Example:

Relatively constantly different from the NZP-CSI-RS power in the eleventh application example, in this application example, the NZP-CSI-RS power may be power adjusted. In this case, if the small cell 1 only notifies the Pc, the small cell 2 does not have enough information to obtain information of the interference power of the small cell 1. Therefore, the small cell 1 notifies the small cell 1 of not only a group of interference degree indicator sequence and a corresponding interference threshold value set, but also the reference signal receiving power (RSRP) measured on the NZP-CSI-RS2. The small cell 2 can know the path loss of the cell 1 interference channel through the RSRP. Via the Pc, it can know the demand of the small cell 1 for the PDSCH interference power. Specifically, it can be achieved via the method of adding a downlink high interference indicator (DL HII) IE entry in the X2 interface protocol, as shown in Table 6.

TABLE 6

Description of downlink high interference indicator IE entry

| IE entry name | Appearance | Range | IE type and reference value | Description |
|---|---|---|---|---|
| DL HII | | 1 . . . <the maximum number of PRBs> | | |
| >HII | Must | | Enumeration (high interference sensitive, medium interference sensitive, low interference sensitive, . . .) | Each PRB corresponds to one location in the list: the first element location in the list corresponds to PRB 0, the second one corresponds to PRB 1, etc "High interference sensitive" indicates that the Pc of the IE recipient does not exceed Pc1, "medium interference sensitive" indicates that the Pc of the IE recipient does not exceed Pc2, "low interference sensitive" indicates that the Pc of the IE recipient does not exceed Pc3 |
| >Pc threshold | Must | enumeration [−8, 15] dB, 1 dB step | enumeration (Pc1, Pc2, Pc3) | Values of Pc1, Pc2 and Pc3 are taken from the given Pc value range in the LTE protocol 36.213 |
| >RSRP | Must | Enumeration (0 . . . 97) | RSRP | The reference signal receiving power is measured on the CRS or CSI-RS corresponding to the IE receiving node |

For example, the small cell 1 notifies the small cell 2, the UE 1 measures to obtain the receiving power RSRP of the CRS port 0 from the small cell 2. After obtaining the RSRP, the small cell 2 can learn the path loss PL=Pt-RSRP corresponding to the interference from the small cell 2 to the small cell 1 with combination of the transmitting power Pt of its respective CRS port 0, that is, the corresponding relationship between the transmitting power of the small cell 2 and the interference power subjected by the small cell 1. Furthermore, the small cell 2 knows the NZP-CSI-RS2 transmitting power Prs, so that, via the Pc threshold, it can know that that interference power threshold on the PDSCH requested by the small cell 1 should not exceed Prs×Pc+PL.

The small cell 1 can also notify the small cell 2 of the path loss PL of the interference channel from the small cell 2. But it needs the small cell 2 notifying the transmitting power of the corresponding CRS port 0 via the X2 interface in advance in order to calculate the PL. In this case, the small cell 1 does not need to send the RSRP to the small cell 2.

The Fourteenth Application Example:

Different from the tenth example, the basic unit of the time-frequency resource in the present example is subframe. In one ABS configuration cycle, the ABS subframes form into one set, and it performs the interference measurement on the ABS subframe set and averages the interference values to calculate the CQI1, while it performs the interference measurement on the non-ABS subframe set and averages the interference values to calculate the CQI2. The cell 1 forms the ABS subframe indicator, the CQI1 and the CQI2 into one downlink OI IE entry and notifies it to the cell 2. Wherein, a downlink subframe interference overload indicator (DL OI) IE entry can be added in the X2 interface protocol to indicate the interference degree, as shown in Table 7.

adjustment. Furthermore, the small cells 1, 2 and 3 can exchange multiple groups of interference degree indicator sequences, for example, the small cell 1 notifies the small cell 2 and the small cell 3 of the interference degree indicator sequences of the small cells 2 and 3, thus the small cells 2 and 3 can jointly perform the resource scheduling adjustment to avoid the interference to the small cell 1.

In addition, the present document further provides a node, comprising:

a receiving module, used to receive first measurement resource information sent by other network nodes to the present node via a backhaul link for coordinated interference measurement;

a processing module, used to determine the second measurement resource information used by the present node for performing the interference measurement according to the first measurement resource information sent by the coordinated network nodes and received by the receiving module, and instruct the relevant coordinated network nodes to perform the resource configuration correspondingly in accordance with the second measurement resource information of the present node; wherein the second measurement resource comprises: interference measurement resources and/or channel state information reference signal (CSI-RS);

a measuring module, used to perform the interference measurement in the second measurement resource determined by the processing module.

| | | | | |
|---|---|---|---|---|
| Table Description of 7 ABS downlink interference overload indicator IE entry | | | | |
| IE entry name | Appearance in IE | Range | IE Type and Reference Value | Description |
| ABS OI | | 1 ... <the maximum number of PRBs> | | |
| >FDD | | 40 subframes | | |
| >>OI | Must | | Enumeration (high interference, medium interference, low interference, ...) | Each location in the bit sequence corresponds to a downlink subframe, wherein "1" indicates that the CQI in the interfered subframes is CQI1, while "0" indicates that the CQI in the interfered subframes is CQI2. The first location in the bit sequence corresponds to the subframe 0 whose radio frame number SFN = 0. The HII configuration pattern of the downlink subframe is repeated cyclically according to the cycle of 40 subframes. |
| >>SINR | Must | Enumerated CQI index (1 ... 15) | Enumeration (CQI1, CQI2) | CQI1 and CQI 2 can be taken from the 4-bit CQI table in the LTE protocol 36.213 |

The Fifteenth Application Example:

Different from the above examples, in this example, the small cell 1 not only notifies the small cell 2 of a group of interference degree indicator sequence and the corresponding interference value set, but also notifies the small cell 3 of a group of interference degree indicator sequences and the corresponding interference value set, the values and contents of these two groups of parameters can be different. The small cells 2 and 3 can respectively perform the resource scheduling adjustment in accordance with the interference degree indicator sequence provided by the small cell 1.

In practical implementations, the small cell 1 can also send the interference degree indicator sequence to more cells, or accept the interference degree indicator sequence sent by other cells, and perform the resource scheduling Preferably, the first measurement resource information received by the receiving module comprises at least:

interference measurement resource information and/or channel information measurement resource;

wherein, the interference measurement resource information comprises at least the time-frequency location information where the interference measurement resource is located;

the channel information measurement resource comprises at least time-frequency locations where non-zero power channel state information reference signals (NZP-CSI-RS) are located corresponding to the other network nodes, sequence generation IDs and the number of ports.

Preferably, the first measurement resource information received by the receiving module further comprises:

ratios Pc of PDSCH EPRE to corresponding NZP-CSI-RS EPREs of the other network nodes, the possible value range of the Pc, or the time-frequency resource indicator associated with the Pc or the possible value range of the Pc.

Preferably, when the first measurement resource information received by the receiving module comprises two or more Pcs or possible value ranges of the Pc, the time-frequency resource indicator associated with each Pc or possible value range of Pc comprises one bit sequence, and each bit in the bit sequence is used to represent one subframe or one system frame in the time domain, or one resource block (RB) or one sub-band in the frequency domain, and the value of each bit is used to indicate whether the time-frequency resources corresponding to the bit are associated with the Pc or the possible value range of the Pc or not.

Preferably, the Pc or the possible value range of the Pc is specifically:

the ratio or the possible value range of the ratio of PDSCH EPRE to NZP-CSI-RS EPRE in a time period and a frequency range;

wherein the time period is a number of consecutive subframes or a subframe set; the frequency range is one physical resource block (PRB), one sub-band, one PRB set, one sub-band set or wideband.

Preferably, the interference measurement resource information received by the receiving module and sent by other network nodes comprises:

configuration information of time-frequency resource of the zero power channel state information reference signals (ZP-CSI-RS) of the other network nodes; and/or, configuration information of time-frequency resource in which the other network nodes cannot be configured as the ZP-CSI-RS.

Preferably, the processing module is used to instruct the relevant coordinated network nodes to perform the resource configuration correspondingly according to the second measurement resource information of the present node, specifically comprising:

the processing module being used to send parameters indicating the time-frequency location where the interference measurement resource is located and a bit sequence and subframe configuration parameters indicating the ZP-CSI-RS resource location; and/or, the processing module being used to send an indicator of silent node corresponding to the interference measurement resource.

Preferably, the indicator of silent node corresponding to the interference measurement resource sent by the processing module comprises:

each interference measurement resource corresponding to one bit, the value of bit being used to indicate whether the relevant coordinated nodes are silent at the corresponding interference measurement resource location or not; or, the interference measurement resource corresponding to one bit sequence, each bit in the bit sequence corresponding to one interference measurement resource, the value of each bit is used for indicating whether the relevant coordinated network nodes are silent at the corresponding interference measurement resource location or not; or, each interference measurement resource corresponding to a group of cell identifications or a list of cell identifications corresponding to the coordinated network nodes, which includes indicating a list of nodes which should or should not be silent at the resource element location of the interference measurement resource.

Preferably, the processing module is used to send indicators with different contents to different network nodes.

Preferably, the processing module is further used to: after the receiving module receives an indicator sent by the other network nodes instructing the present node to perform a resource configuration in accordance with the interference measurement resource information of the other network nodes, be silent or avoid to be silent in the corresponding resource according to the indicator.

Preferably, the processing module is further used to: after the receiving module receives an indicator sent by the other network nodes instructing the present node to perform a resource configuration in accordance with the interference measurement resource information of the other network nodes, and control transmitting powers of the PDSCH and NZP-CSI-RS in the corresponding time frequency resource according to the associated time-frequency resource indicator and the Pc or the value range of Pc carried in the interference measurement resource information of the other network nodes.

Preferably, the measuring module is further used to: after performing the interference measurement in the measurement resource, send the interference indicator information from adjacent cells in the time frequency resource in the cell where the node is located to other network nodes via a backhaul link;

the processing module is further used to: after the receiving module receives the interference indicator information sent by the other network nodes, adjust a resource scheduling to avoid interference according to the interference indicator information;

wherein the interference indicator information transmitted by the measuring module comprises at least: an interference degree indicator sequence composed of indicators of interference degrees subjected by the present cell from the adjacent cells or interference degrees on the adjacent cells in a plurality of particular time-frequency resources within the cell where the present node is located; and/or, interference values corresponding to the interference degrees, or an interference value set composed of interference thresholds corresponding to the interference degrees.

Preferably, the particular time-frequency resource comprises: a subframe set, physical resource blocks on a plurality of consecutive subframes, a sub-band or a wideband.

Preferably, interference values in the interference value set comprise: a signal to interference plus noise ratio (SINR), interference power, a ratio Pc of physical downlink shared channel (PDSCH) EPRE to corresponding non-zero power channel state information reference signal (NZP-CSI-RS) EPRE, a ratio PA of PDSCH EPRE to cell-specific reference signals (CRS), or a channel quality indicator (CQI) index;

accordingly, the interference threshold comprises: a SINR threshold, interference power threshold, Pc threshold, PA threshold or CQI threshold.

Preferably, elements in the interference degree indicator sequence comprises:

interference values in the interference value set; and/or,
an interference degree level indicator; and/or,
an interference sensitive level indicator; and/or,
one bit or bit sequence, used for indicating values in the interference value set.

Preferably, the processing module only takes some or all of the time-frequency resources associated with the corresponding interference degree or interference sensitive degree as a reference resource when determining different interference values or interference thresholds in the interference value set.

Those ordinarily skilled in the art can understand that all or some of steps of the abovementioned method may be completed by programs instructing the relevant hardware, and the programs may be stored in a computer-readable storage medium, such as read only memory, magnetic or optical disk. Alternatively, all or some of the steps of the abovementioned embodiments may also be implemented by using one or more integrated circuits. Accordingly, each module/unit in the abovementioned embodiments may be realized in a form of hardware, or in a form of software function modules. The present document is not limited to any specific form of hardware and software combinations.

The above description is only the preferred embodiments of the present invention and is not intended to limit the protection scope of the present document. According to the inventive content of the present document, there may be many other embodiments, and without departing from the spirit and essence of the present document, those skilled in the art can make appropriate changes and modifications in accordance with the present document, and all changes, equivalent replacements and improvements made within the spirit and principle of the present document should be included within the protection scope of the present document.

INDUSTRIAL APPLICABILITY

With the embodiment of the present invention, the cells can obtain the interference measurement resource configuration used for an accurate interference measurement to avoid conflicts of interference measurement resource configuration between the cells; through the indicators of the expected downlink reference signal to the downlink service EPRE ratio, the cell can obtain the expected interference information of the adjacent cells; by exchanging more accurate quantifiable interference level information, the cells can perform a more accurate resource scheduling to avoid the inter-cell interference.

What is claimed is:

1. A method for inter-cell coordinated interference measurement, applied to nodes performing a coordinated interference measurement, comprising:
   receiving, by a current node, first measurement resource information used for performing a coordinated interference measurement and sent by other coordinated nodes via a backhaul link;
   according to the first measurement resource information sent by the other coordinated nodes, determining second measurement resource information used by the current node to perform an interference measurement, and instructing the coordinated nodes to perform a resource configuration according to the second measurement resource information of the current node;
   performing the interference measurement in the second measurement resource;
   wherein the second measurement resource comprises: an interference measurement resource and/or a channel state information reference signal (CSI-RS); the first measurement resource information comprises: interference measurement resource information and/or channel information measurement resource, and the first measurement resource information further comprises: ratios Pc of Physical Downlink Shared Channel (PDSCH) Energy per Resource Element (EPRE) to corresponding non-zero power channel state information reference signal (NZP-CSI-RS) EPRE of the other coordinated nodes, a possible value range of the Pc, or a time-frequency resource indicator associated with the Pc or the possible value range of the Pc.

2. The method of claim 1, wherein, the interference measurement resource information comprises at least time-frequency location information where an interference measurement resource is located; the channel information measurement resource comprises at least time-frequency locations where NZP-CSI-RSs are located corresponding to the other network nodes, sequence generation IDs and the number of ports.

3. The method of claim 1, wherein, when the first measurement resource information comprises two or more Pcs or possible value ranges of the Pc, and the time-frequency resource indicator associated with each Pc or the possible value range of Pc comprises one bit sequence, and each bit in the bit sequence is used to represent one subframe or one system frame in a time domain, or one resource block (RB) or one sub-band in a frequency domain, and the value of each bit is used to indicate whether a time-frequency resource corresponding to the bit is associated with the Pc or the possible value range of the Pc or not;
   wherein the Pc or the possible value range of the Pc is: the ratio of the PDSCH EPRE to the NZP-CSI-RS EPRE or the possible value range of the ratio in a time period and a frequency range;
   wherein the time period is a number of consecutive subframes or a subframe set; the frequency range is one physical resource block (PRB), one sub-band, one PRB set, one sub-band set or wideband.

4. The method of claim 2, wherein, the received interference measurement resource information sent by the other coordinated nodes comprises:
   configuration information of time-frequency resources of zero power channel state information reference signals (ZP-CSI-RS) of the other coordinated nodes; and/or,
   configuration information that resources of the other coordinated nodes cannot be configured as time-frequency resources of ZP-CSI-RSs.

5. The method of claim 1, wherein, said instructing the coordinated nodes to perform the resource configuration according to the second measurement resource information of the current node comprises:
   sending parameters indicating a time-frequency location where an interference measurement resource is located as well as a bit sequence and subframe configuration parameters indicating a ZP-CSI-RS resource location; and/or,
   sending an indicator of a silent node corresponding to the interference measurement resource;
   wherein the indicator of a silent node corresponding to the interference measurement resource comprises:
   each interference measurement resource corresponding to one bit, the value of bit being used for indicating whether the relevant coordinated node is silent at a corresponding interference measurement resource location or not, or
   the interference measurement resource corresponding to one bit sequence, each bit in the bit sequence corresponding to one interference measurement resource, the value of each bit being used for indicating whether the relevant coordinated network node is silent at a corresponding interference measurement resource location or not, or each interference measurement resource corresponding to a group of cell identifications or list of cell identifications corresponding to the coordinated network nodes, which comprises indicating a list of nodes which should or should not be silent at a resource element location of the interference measurement resource;

wherein contents of indicators sent to different coordinated nodes are different.

6. The method of claim 1, wherein,
the backhaul link comprises at least: an X2 interface or S1 interface.

7. The method of claim 1, further comprising: after receiving indicators sent by the other coordinated nodes instructing the current node to perform resource configurations according to the interference measurement resource information of the other coordinated nodes, being silent or avoiding to be silent in corresponding resources according to the indicators.

8. The method of claim 1, further comprising:
after performing the interference measurement in the second measurement resource, the current node sending first interference indicator information, which is received from adjacent cells in a time-frequency resource in a cell where the current node is located, to the other coordinated nodes via the backhaul link;
after receiving second interference indicator information sent by the other coordinated nodes, adjusting a resource scheduling to avoid interference according to the second interference indicator information;
wherein the first interference indicator information comprises at least: an interference degree indicator sequence composed of indicators of interference degrees subjected by the current node from the adjacent cells or interference degrees on the adjacent cells in several particular time-frequency resources within the cell where the current node is located; and/or, an interference value set composed of interference values corresponding to the interference degrees, or an interference value set composed of interference thresholds corresponding to the interference degrees.

9. The method of claim 8, wherein, the particular time-frequency resource comprises: a subframe set, physical resource blocks on a plurality of consecutive subframes, a sub-band or a wideband;
the interference values in the interference value set comprise: a signal to interference plus noise ratio (SINR), interference power, a ratio Pc of PDSCH EPRE to corresponding NZP-CSI-RS EPRE, a ratio PA of PDSCH EPRE to cell-specific reference signals (CRS), or a channel quality indicator (CQI) index; and the interference threshold comprises: a SINR threshold, an interference power threshold, a Pc threshold, a PA threshold or a CQI threshold;
elements in the interference degree indicator sequence comprise: interference values in the interference value set; and/or, an interference degree level indicator; and/or, an interference sensitive degree level indicator; and/or, one bit or bit sequence, used for indicating values in the interference value set; and wherein, when the current node determines different interference values or interference thresholds in the interference value set, only some or all of time-frequency resources associated with corresponding interference degrees or interference sensitive degrees are used as reference resources.

10. A node, comprising a processor, and a storage device for storing computer executable instructions that when executed by the processor cause the processor to perform the steps in following modules:
a receiving module, configured to: receive first measurement resource information used for performing a coordinated interference measurement and sent by other coordinated nodes to the node via a backhaul link;
a processing module, configured to: determine second measurement resource information used by the node to perform an interference measurement according to the first measurement resource information received by the receiving module, and instruct the coordinated nodes to perform a resource configuration according to the second measurement resource information of the node;
a measuring module, configured to: perform the interference measurement in the second measurement resource determined by the processing module;
wherein the second measurement resource comprises: an interference measurement resource and/or a channel state information reference signal (CSI-RS); the first measurement resource information comprises: interference measurement resource information and/or channel information measurement resource, and the first measurement resource information further comprises: ratios Pc of Physical Downlink Shared Channel (PDSCH) Energy per Resource Element (EPRE) to corresponding non-zero power channel state information reference signal (NZP-CSI-RS) EPRE of the other coordinated nodes, a possible value range of the Pc, or a time-frequency resource indicator associated with the Pc or the possible value range of the Pc.

11. The node of claim 10,
wherein, the interference measurement resource information comprises at least time-frequency location information where an interference measurement resource is located; the channel information measurement resource comprises at least time-frequency locations where NZP-CSI-RS are located corresponding to the other network nodes, sequence generation IDs and the number of ports.

12. The node of claim 10, wherein the receiving module is configured to: when the received first measurement resource information comprises two or more Pcs or possible value ranges of the Pc, the time-frequency resource indicator associated with each Pc or possible value range of Pc comprises one bit sequence, and each bit in the bit sequence is used to represent one subframe or one system frame in a time domain, or one resource block (RB) or one sub-band in a frequency domain, and the value of each bit is used to indicate whether time-frequency resources corresponding to the bit are associated with the Pc or the possible value range of the Pc or not;
wherein the Pc or the possible value range of the Pc is: the ratio of the PDSCH EPRE to the NZP-CSI-RS EPRE or the possible value range of the ratio in a time period and a frequency range;
wherein the time period is a number of consecutive subframes or a subframe set; the frequency range is one physical resource block (PRB), one sub-band, one PRB set, one sub-band set or wideband.

13. The node of claim 11, wherein,
the interference measurement resource information received by the receiving module and sent by the other coordinated nodes comprises:

configuration information of time-frequency resources of zero power channel state information reference signals (ZP-CSI-RS) of the other coordinated nodes; and/or, configuration information that resources of the other coordinated nodes cannot be configured as time-frequency resources of ZP-CSI-RSs.

14. The node of claim 10, wherein, the processing module is configured to: instruct the coordinated nodes to perform the resource configuration according to the second measurement resource information of the node by the following way:

the processing module sending parameters indicating a time-frequency location where the interference measurement resource is located as well as a bit sequence and subframe configuration parameters indicating a ZP-CSI-RS resource location; and/or, the processing module sending an indicator of a silent node corresponding to the interference measurement resource;

wherein the indicator of silent node corresponding to the interference measurement resource sent by the processing module comprises:

each interference measurement resource corresponding to one bit, the value of bit being used to indicate whether the relevant coordinated nodes are silent at a corresponding interference measurement resource location or not, or the interference measurement resource corresponding to one bit sequence, each bit in the bit sequence corresponding to one interference measurement resource, and the value of each bit being used for indicating whether the relevant coordinated network nodes are silent at a corresponding interference measurement resource location or not, or each interference measurement resource corresponding to a group of cell identifications or list of cell identifications corresponding to the coordinated network nodes, which includes indicating a list of nodes which should or should not be silent at resource element locations of the interference measurement resource;

the processing module is further configured to: send indicators with different contents to different coordinated nodes.

15. The node of claim 10, wherein, the processing module is further configured to: after the receiving module receives indicators, sent by the other coordinated nodes, instructing the node to perform resource configurations according to the interference measurement resource information of the other coordinated nodes, be silent or avoid to be silent in a corresponding resource according to the indicators.

16. The node of claim 10, wherein, the processing module is further configured to: after the receiving module receives indicators, sent by the other coordinated nodes, instruct the node to perform resource configurations according to the interference measurement resource information of the other coordinated nodes, control transmitting powers of the PDSCH and NZP-CSI-RS in the corresponding time-frequency resources according to the Pc or the value range of Pc carried in the interference measurement resource information of the other coordinated nodes as well as the associated time-frequency resource indicators.

17. The node of claim 10, wherein, the measuring module is further configured to: after performing the interference measurement in the second measurement resource, send first interference indicator information, which is received from adjacent cells in a time-frequency resource in a cell where the node is located, to the other coordinated nodes via the backhaul link;

the processing module is further configured to: after the receiving module receives second interference indicator information sent by the other coordinated nodes, adjust a resource scheduling to avoid interference according to the second interference indicator information;

wherein the first interference indicator information transmitted by the measuring module comprises at least: an interference degree indicator sequence composed of indicators of interference degrees subjected by the node from the adjacent cells or interference degrees on the adjacent cells in several particular time-frequency resources within the cell where the node is located; and/or, an interference value set composed of interference values corresponding to the interference degrees, or an interference value set composed of interference thresholds corresponding to the interference degrees.

18. The node of claim 17, wherein, the particular time-frequency resources comprises: a subframe set, physical resource blocks on a plurality of consecutive subframes, a sub-band or a wideband;

the interference values in the interference value set comprise: a signal to interference plus noise ratio (SINR), interference power, a ratio Pc of PDSCH EPRE to corresponding NZP-CSI-RS EPRE, a ratio PA of PDSCH EPRE to cell-specific reference signals (CRS), or a channel quality indicator (CQI) index; and the interference threshold comprises: a SINR threshold, an interference power threshold, a Pc threshold, a PA threshold or a CQI threshold;

elements in the interference degree indicator sequence comprise: interference values in the interference value set; and/or, an interference degree level indicator; and/or, an interference sensitive degree level indicator; and/or, one bit or bit sequence, used for indicating values in the interference value set; and wherein, the processing module is configured to: when determining different interference values or interference thresholds in the interference value set, only take some or all of time-frequency resources associated with corresponding interference degrees or interference sensitive degrees as reference resources.

19. The method of claim 1, further comprising: after receiving indicators, sent by the other coordinated nodes, instructing the current node to perform resource configurations according to the interference measurement resource information of the other coordinated nodes, controlling transmitting powers of the PDSCH and NZP-CSI-RS in the corresponding time-frequency resources according to the Pc or the value range of Pc carried in the interference measurement resource information of the other coordinated nodes as well as the associated time-frequency resource indicators.

* * * * *